(12) United States Patent
Mathieu et al.

(10) Patent No.: US 9,091,008 B2
(45) Date of Patent: Jul. 28, 2015

(54) METHOD FOR ASSEMBLING A CONVEYOR BELT, USE THEREOF, AND CONVEYOR BELT

(75) Inventors: Herve Mathieu, Bavilliers (FR); Daniel Roessner, Mulhouse (FR); Jean-Yves Drean, Brunstatt (FR); Jean-Francois Osselin, Ballersdorf (FR)

(73) Assignee: COBRA EUROPE, Luxeuil les Bains (FR)

( * ) Notice: Subject to any disclaimer, the term of this patent is extended or adjusted under 35 U.S.C. 154(b) by 135 days.

(21) Appl. No.: 13/880,818

(22) PCT Filed: Nov. 16, 2011

(86) PCT No.: PCT/FR2011/000608
§ 371 (c)(1),
(2), (4) Date: Apr. 22, 2013

(87) PCT Pub. No.: WO2012/066199
PCT Pub. Date: May 24, 2012

(65) Prior Publication Data
US 2013/0228422 A1    Sep. 5, 2013

(30) Foreign Application Priority Data

Nov. 16, 2010  (FR) ..................................... 10 04442
Jan. 18, 2011  (FR) ..................................... 11 00140

(51) Int. Cl.
*B65G 15/34*      (2006.01)
*F16G 3/10*       (2006.01)
*D05B 1/02*       (2006.01)
*B65G 15/30*      (2006.01)

(52) U.S. Cl.
CPC .................. *D05B 1/02* (2013.01); *B65G 15/30* (2013.01); *B65G 15/34* (2013.01); *F16G 3/10* (2013.01)

(58) Field of Classification Search
CPC .................................... F16G 3/10; B65G 15/34
USPC ............................... 198/844.2, 846, 847, 617
See application file for complete search history.

(56) References Cited

U.S. PATENT DOCUMENTS

| 4,427,107 A * | 1/1984 | Roberts et al. ............. 198/844.2 |
| 5,670,230 A * | 9/1997 | Schlueter, Jr. et al. .......... 428/57 |
| 5,951,441 A * | 9/1999 | Dalebout et al. ................ 482/54 |
| 2003/0201057 A1* | 10/2003 | Dolan et al. .................... 156/98 |

FOREIGN PATENT DOCUMENTS

| DE | 39933710 A1 | 4/1990 |
| DE | 4118946 A1 | 5/1992 |
| DE | 29918374 U1 | 11/2000 |
| GB | 2090788 A | 7/1982 |
| JP | 2002372106 A | 12/2002 |

OTHER PUBLICATIONS

Search report of Jun. 29, 2011 in related FR 2 967 408.

* cited by examiner

*Primary Examiner* — Mark A Deuble
(74) *Attorney, Agent, or Firm* — Young Law Firm, P.C.

(57) ABSTRACT

The invention relates to a method for assembling, by means of sewing, two ends (2, 3) of a conveyor belt (1) consisting of a carcass (4) and a covering (5), said method including the following steps: preparing the ends so as to impart a suitable shape thereto; depositing the covering over a predetermined length of each of the ends; sewing, along a predetermined sewing field, in order to assemble the two carcasses; and positioning a covering so as to cover the seam. The ends of said belt to be assembled have a toothed or staggered shape.

17 Claims, 5 Drawing Sheets

METHOD FOR ASSEMBLING A CONVEYOR BELT, USE THEREOF, AND CONVEYOR BELT

This invention concerns an assembly by joining of a conveyor belt.

First of all, the invention relates to the assembly of conveyor belts by means of sewing following particular paths forming a sewing field.

In different sectors of industry such as mining, quarrying and the food processing industry, goods are transported on conveyor belts. These conveyor belts are installations on an industrial scale. They are formed from one or more layers of textile material whose function is to convey the load, and a rubber covering which serves to protect the textile layers from wear and impacts. For reasons relating to handling and transportation to the site, the belt sections are manufactured in rolls which can weigh up to 10 tonnes. These rolls have an average length of 200 m. The sections of belt are then assembled on the site where the conveyor is being installed to form a belt than can be up to several tens of kilometres in length. This results in a large number of joins.

In the prior art some splices are done by vulcanisation (hot joining), or by adding parts (mechanical joining) or by adhesive bonding (cold joining). These types of joins all take time to do. If the splice ruptures in use, considerable losses can be caused by the conveyor system being out of use. Assembly is a real problem, all the more so as it weakens the belt. In fact, in the best cases a strength of 75% of the nominal tensile strength of the belt is achieved, and in many cases a strength of only 50% of the nominal tensile strength of the belt, the join is the weak point, of the conveyor belt.

Patent. DE 39 33 710 A1 discloses a method of joining the ends of conveyor belts by adhesive bonding. To achieve good adherence adhesive bonding requires a very large surface. To achieve this, the end of the belt is cut into teeth as long as possible with angles as acute as possible to increase the surface area. This type of join has other disadvantages relating to the adhesive, which is a chemical product, and the press, which depends on the material. Furthermore, there must be no interference with the adhesive or the press from the environment. Consequently, the operator mast be particularly attentive, and with this method failures can occur when joining the belts.

The prior art also teaches mechanical splicing methods such as stapling.

Stapling consists of perforating the ends of the belt, then assembling the said belts using very heavy duty metal fasteners, staples, which connect the holes in the two belts. Unlike adhesive bonding, this method allows for small surfaces for the join. But the holes the staples pass through weaken the belt (patent DE 41 18 946 A1 discloses holes in the belt suitable for stapling in which threads are used instead of staples to join the belts by binding).

Finally, the applicant has found that sewing gives the bests results. This is a mechanical method of splicing using threads over a long area (see patent JP 2002 372106 A)

Sewing over a very long area imparts more strength to the belt. It therefore overcomes the disadvantages of stapling or binding without having the disadvantages of adhesive bonding.

This invention therefore falls within the field of splicing by sewing.

But the joins currently known cannot be adapted to different types of belts.

This invention seeks to resolve this technical problem with a solution that damages the carcass as little as possible.

To achieve this, the applicant has found by carrying out trials that it is necessary to distribute the stresses over the surface.

For example, the trials have shown that adding thickness does not solve this technical problem. On the other hand, the trials mentioned in the description indicate the structure found by the applicant to solve the technical problem.

There is therefore a need to improve these joins, by improving their resistance and strength.

The aim of the invention is to meet these needs, and to resolve at least a part of the problems raised by the prior art, in particular to obtain a universal belt join suitable for all types of conveyor belt carcass.

To solve the technical problem in the invention, the applicant connects the "male" carcass to the "female" carcass through its entire thickness, with a distribution of the stresses by means of the following steps:

a. preparing the ends of the belts so as to impart a suitable shape to the join, namely a toothed shape;

b. removal of the covering over a predetermined length of each of the ends:

c. sewing over a predetermined sewing field to assemble the carcasses (4) of the two belt ends:

d. positioning a covering (5) so as to cover the seam.

None of the patents referred to above achieves this.

The belt splicing by sewing with belt ends in a toothed shape described by document JP 2002 372106 A Although this is the document closest to the invention known to the applicant, by contrast with the invention, its purpose is different.

This document concerns the joining of an aramid belt. This is a very fine belt with one layer of fabric without a matrix.

This document does not teach how to cover all types of belt carcasses. Quite the contrary, this is an edge-to-edge seam. Therefore one that pulls and can cause pulling apart from the carcasses.

The invention distributes the stresses by means of sewing over a surface area and covering the teeth.

By contrast with this invention, the teeth in document JP 2002 372106 A have a different function. They serve to avoid the hinge effect and not to distribute the stresses. They are not combined with a covering.

Thus, unlike the invention, this known document does not aim to provide a universal join; but it is limited to only one particular type of belt.

It does not seek to distribute the stresses by covering the belt join, but provides for an end join.

The belt join with holes in the belts for assembly by binding described by document DE 41 18 986 A1

Although this join includes teeth, the holes are not in the teeth. The holes are positioned in accordance with a joining: structure by stapling.

The staples are replaced by threads. This known technique is joining by binding. The binding threads allow a few percent to be gained over staples. But this technique requires a very careful proportioning depending on the diameters of the holes and the diameters of the binding threads. This requires manual operations. By contrast with the invention, which does not provide for bound fabrics, but sewn fabrics and allows the use of a sewing machine.

Consequently the technique described in document DE 41 18 986 A1 does not fall within the same field as that of the invention.

In this known technique, unlike in the invention, the binding is superficial, one side of the reinforcement fabric is not bound to the other, the stresses pass through the teeth. The binding is limited to the end and seeks to join the teeth edge to edge. This is very different to the covering in the invention. Such a technique by binding does not allow for the distribution of the stresses over the surface necessary to obtain the results provided by the invention. Which explains why this document, like document JP 2002 372106 A, does not lead to seeking the tooth shapes and dimensions necessary to the invention.

Consequently, the method described by document DE 41 18 986 A1 presents specific difficulties (proportions) and does not allow product shapes to be achieved that resolve the technical problem the invention aims to solve.

Moreover, there is nothing that would lead a person skilled in the art to combine the techniques in the two documents mentioned.

In addition, in the techniques disclosed by the two above-mentioned documents, the teeth do not have the same geometry as in the invention, the threads are not the high tenacity threads of the invention, and do not cover the angles of the join as in the invention.

Thus, the invention fulfils the requirement to improve these joins, by improving their resistance and strength.

The aim of the invention is to meet these needs, and to resolve at least a part of the problems raised by the prior art, in particular to obtain a universal belt join suitable for all types of conveyor belt carcass.

To this end a method is proposed to assemble two conveyor belt ends by means of sewing following particular paths forming a sewing field. The two belt ends include at least a carcass and a covering, by means of sewing.

The method of assembly includes the following steps:

removing the covering over a predetermined length of each of the ends:

preparing the ends of the belts so as to impart a suitable shape and state to the join, namely a toothed shape;

positioning the covering over a predetermined length of each of the ends;

sewing according to a predetermined sewing field to assemble the two carcasses positioning a covering so as to cover the seam.

This method is particular in that the sewing is done according to a sewing field predetermined according to the type of conveyor belt.

Conveyor belts are made up of one or more plies. The ply (or assembly of plies) is known as the carcass.

Belts consisting of only one ply, known as single-ply, are assembled by cutting the two ends into matching toothed shapes. Sewing serves to join the material thus obtained together.

Belts made up of several plies, known as multi-ply belts, are assembled by an alternative method. This consists, on the two belt ends to be assembled, of cutting the plies individually, staggering the position of each ply, to obtain a sort of step formation, with each end being complementary to the other, which also imparts an interpenetration to the carcasses.

Sewing will mechanically join the ends thus obtained together.

This method is particular in that the mechanical assembly is obtained in a uniform manner thanks to the sewing field. In fact, sewing in the form of a vertical suture or in a zigzag pattern does not provide a satisfactory assembly. The high density of sewing threads and perforations in the material will lead to an ineffective assembly.

The solution of the sewing field according to the invention allows the stresses to be transferred from one end to the other in a homogeneous fashion.

The toothed and staggered shapes are used to obtain a good dynamic behaviour, although we know that assembly with straight or diagonal ends can be achieved with a woven or non-woven reinforcement, sewn at both ends: but the dynamic behaviour of such a jour is less effective.

As a variant, the conveyor belt may consist of at least the carcass, an interply and the covering.

According to other characteristics of the method:

an extra step consisting of inserting woven or non-woven reinforcements by means of sewing is provided between the steps of removing the covering and sewing to assemble the carcasses.

the said teeth may vary in length from 10 mm to 5000 mm depending on the thickness and width of the conveyor belt to be spliced, and will preferably be of the order of 200 mm. Strength is improved if the length is increased.

the length of the said staggered steps is defined according to the type of belt, the number of plies, the width and thickness of the belt, and may range from 1 mm to 5000 mm, preferably being of the order of 50 mm, with the strength improving as the length increases.

the said sewing presents a sewing density of 1 thread per cm to 100 threads/cm, depending on the thickness, width and type of the conveyor belt to be spliced, preferably being of the order of 15 to 20 threads/cm.

the thread material is typically a liquid crystal polymer. In fact, this material is a good compromise between the specific strength, breaking strain, heat resistance and knot strength. The thread will have a high coefficient of friction.

the complementary angle of the angle of the sewing threads in relation to the longitudinal axis of the belt is between 0 and 90° inclusive, preferably being of the order of 45°. The complementary angle is the angle remaining to reach 90°. Thus when the said complementary angle is 30°, the angle of the sewing in relation to the longitudinal axis of the belt is 60°.

two different directions of sewing are applied to the sewing field so as to cross the corresponding threads, preferably substantially symmetrically in relation to the longitudinal axis of the belt. Crossing the threads in this way improves the strength of the seam.

the length of the stitch may vary from 1 to 200 mm, preferably being between 3 and 20 mm.

the angle of the teeth in relation to the longitudinal axis of the belt is between 0° and 90° inclusive, preferably being defined according to the width and thickness of the conveyor belt to be spliced and preferably being of the order of 7°. The aim is to obtain a larger number of teeth rather than bigger angles, whilst maintaining sufficient solidity.

the mechanical assembly of the two ends is achieved thanks to the sewing field in order to avoid a "zigzag" or suture-type seam.

This invention also concerns the use of a sewing method consistent with those described above to obtain the assembly of two ends of a conveyor belt comprising a carcass and a covering.

The invention also relates to a conveyor belt including a carcass and a covering. The conveyor belt is made up of sections including at least a carcass and a covering, the said sections being assembled by a sewing field of a defined density, with a symmetrical or dissymmetrical cut, that is to say with offset teeth.

BRIEF DESCRIPTION OF THE DRAWINGS

Other advantages of the invention will be revealed by reading the description of a non-limitative example of an embodiment and the attached drawings, in which.

DESCRIPTION

Figure 1:
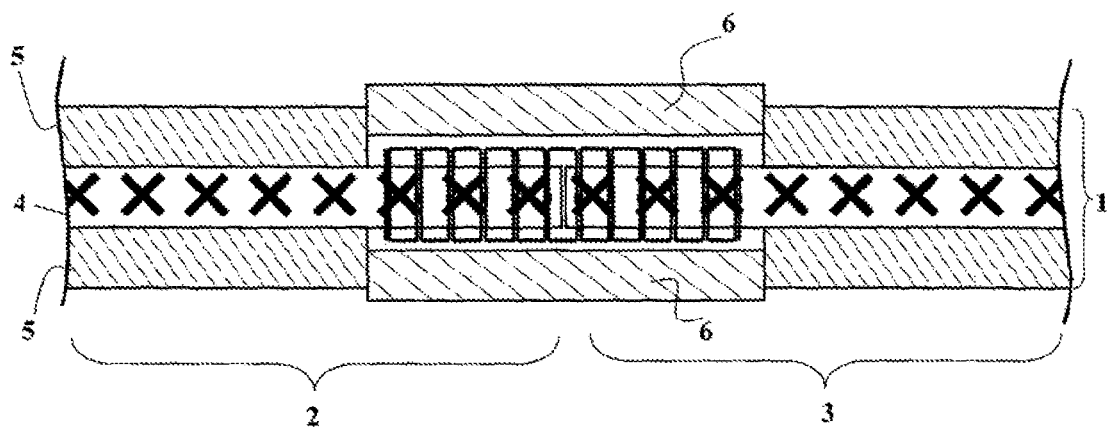
FIG. 1 represents a first view of two belt ends sewn together.
Figure 2:
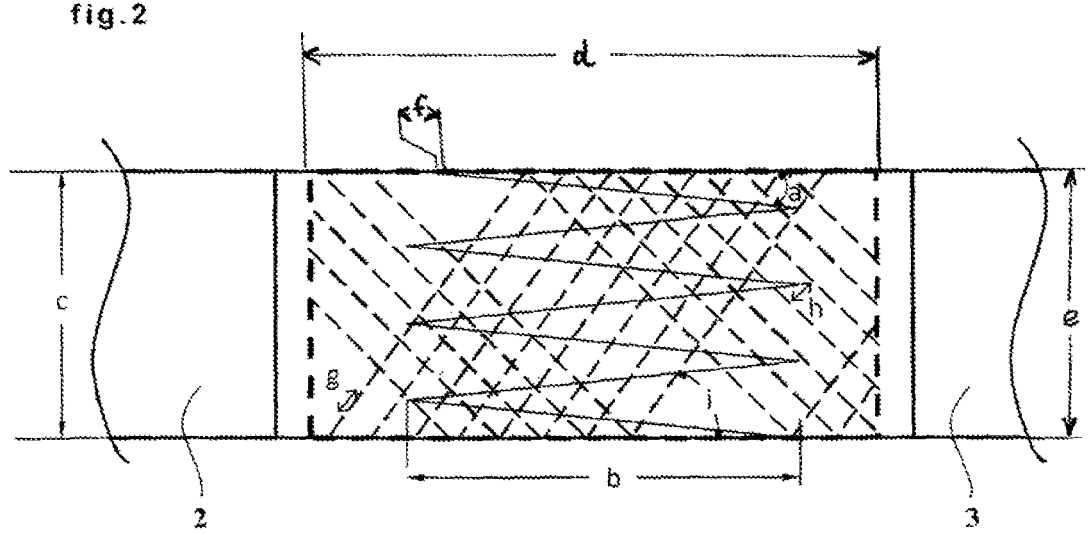
FIG. 2 represents a second view of the two belt ends shown in FIG. 1.

We see in FIGS. 1 and 2 a belt 1 consisting of two ends 2 and 3 assembled together. The belt 1 comprises a carcass 4 and a covering 5, made of rubber. The carcass imparts mechanical strength to the belt, whilst the covering 5 protects the carcass and provides resistance to external agents such as humidity, fire, chemical resistance to the weather, to the goods transported, resistance to impacts and/or abrasion. Thus, the covering provides durability.

The material of the covering may be PVC or rubber for example.

The sewing is also protected by a piece of covering 6 added after sewing.

The ends 2 and 3 are tooth shaped.

FIG. 2 shows the different parameters which may be taken into account in the join.

a: the angle of the teeth in relation to the longitudinal axis of the belt.

b: the length of the teeth, which depends on the type of belt.

c: the width of the join, which is the same as that of the belt to be spliced.

g: the length of the stitch, which has an influence on the effectiveness of the seam.

h: the sewing density expressed as a number of threads per cm.

i: the angle of the sewing in relation to the longitudinal axis of the belt.

The sewing is done following determined paths characterised by the angle between the sewing path and the longitudinal axis of the belt.

The sewing field formed by a large number of sewing passes, defined by the sewing density, must be longer than the teeth and as wide as the belt to be spliced.

Figure 3:
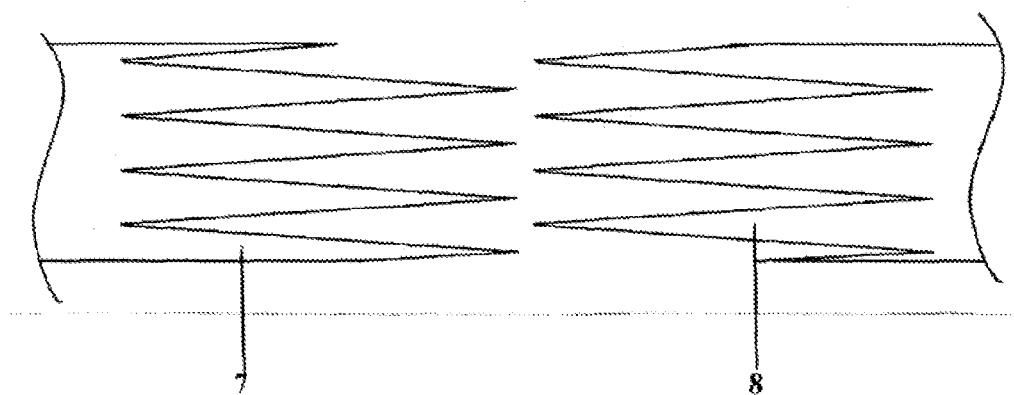
FIG. 3 represents one method of cutting the two belt ends.
Figure 4:
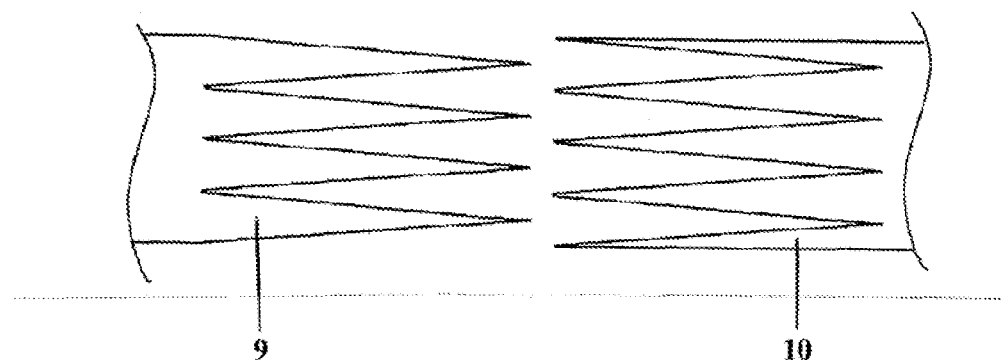
FIG. 4 represents one method of cutting the two belt ends.
Figure 5:
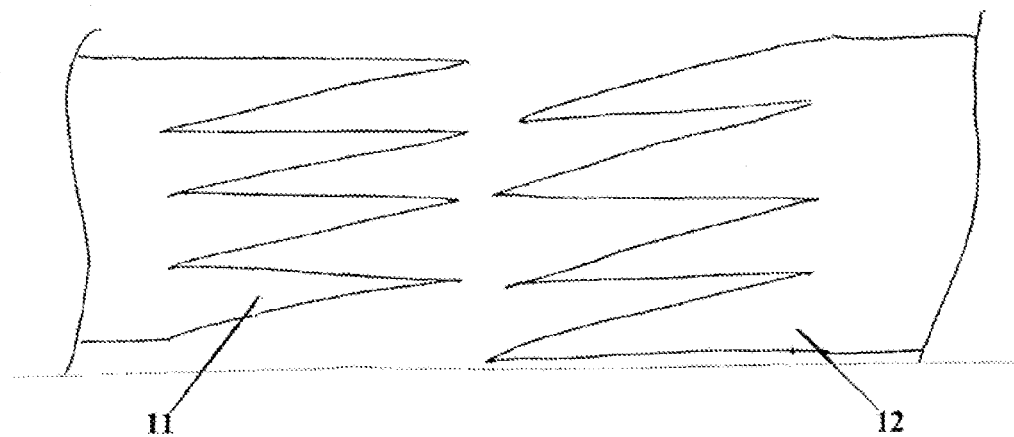
FIG. 5 represents a symmetrical method of cutting the two belt ends.

The tooth profiles possible according to the invention shown in FIGS. 3, 4 and 5 present ends 7 and 8 cut according to profiles that are asymmetrical in relation to the median plane of the belt.

Ends 9 and 10 are cut according to profiles that are symmetrical in relation to the median plane of the belt.

Ends 11 and 12 are cut with non-homogeneous angles on the two sides of the teeth.

The teeth can be cut using a Stanley knife, a rotary cutter, a pair of shears or any other cutting object, whether electrical or not.

Figure 6:
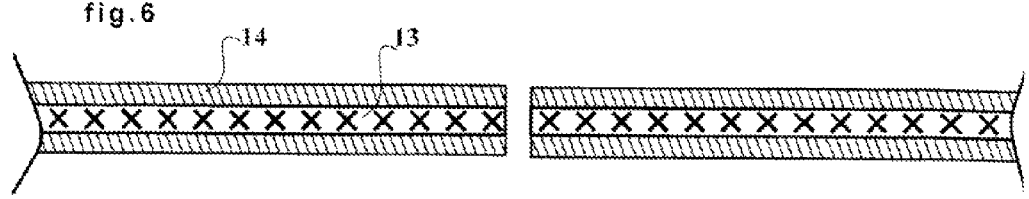
FIG. 6 represents a dissymmetrical method of cutting the two belt ends.

Details of a join made by means of sewing on a single-ply belt:

FIG. 6 shows two ends of a single-ply conveyor belt to be spliced together, in which items 13 and 14 represent the single-ply carcass and its rubber covering respectively.

According to one method of executing the steps in the method according to the invention:

The first step in the joining method shown in FIG. 6 is to cut the two ends to be joined at right angles.

This step can be done using a sharp blade for example or any type of cutting tool, electrical or pneumatic, or by water jet. . . .

Figure 7:
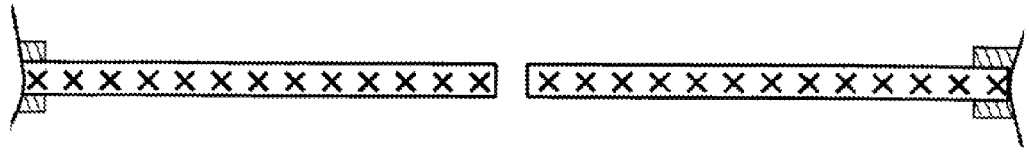
FIGS. 7 to 17 represent the parts of the belt during the steps of the method according to the invention.
Figure 8:
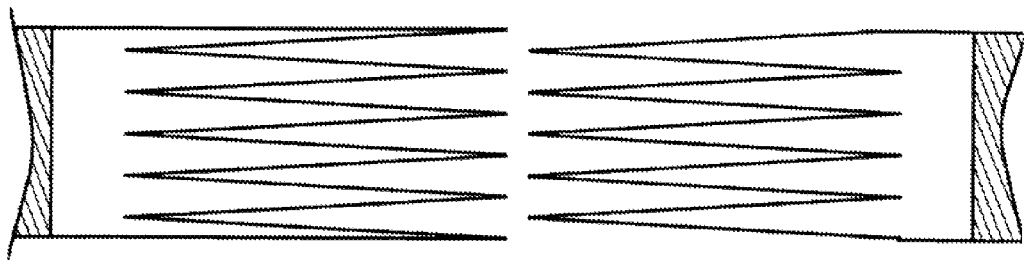

The second step shown in FIG. 7 consists of removing the covering. This step can be done using a Stanley knife to remove strips of covering or by sanding the covering with a disc sander for example. The length of the covering removed must be longer than the length of the teeth.

The third step consists of cutting the teeth according to the profile chosen. The different profiles shown in FIGS. 3 to 5 may be used without the list of profiles envisageable being fixed; what is essential according to the invention is to have gradual reductions in cross section in the teeth in order to provide a progressive transfer of the tensile stresses from one belt end to the other. The cut can be made using a Stanley knife or any other cutting object, whether electrical or not.

Figure 9:
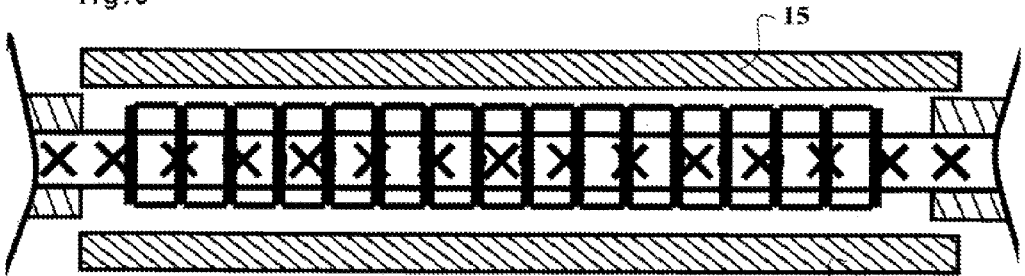

The fourth step shown in FIG. 9 consists of sewing the teeth together following the defined paths shown in FIG. 2.

The aim is to obtain the sewing field filled in a homogeneous way so as to distribute the tensile stresses.

The sewing may be done using a so-called heavy duty sewing machine, for example the 204 model of the Durkopp-Adler brand. This type of machine is suitable for thicknesses of material up to 14 mm.

The fifth step is to cover the sewing with a piece of the covering 15. This step can be achieved by adhesive bonding or vulcanisation for example. This step is needed to protect the sewing, in particular from the wear caused by the material transported by the conveyor belt.

Figure 10:
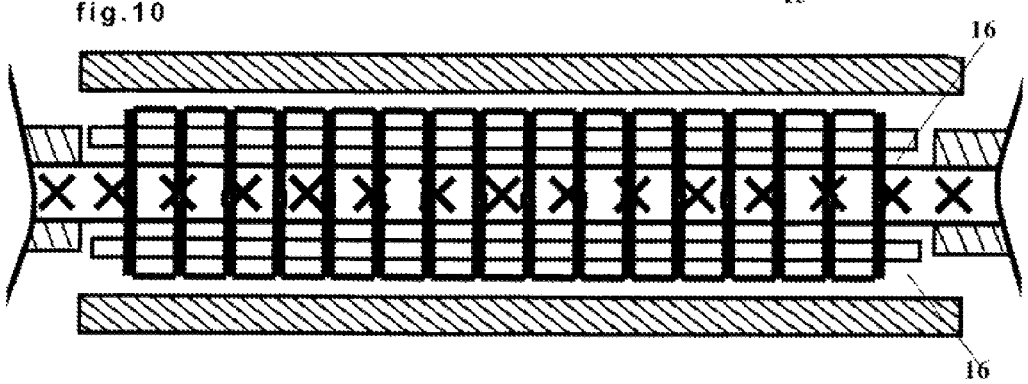

The addition of a textile or other reinforcement, a step illustrated in FIG. 10 is a way of improving the efficiency of the join. The reinforcement must be put in place before sewing the sandwich thus obtained.

Figure 11:
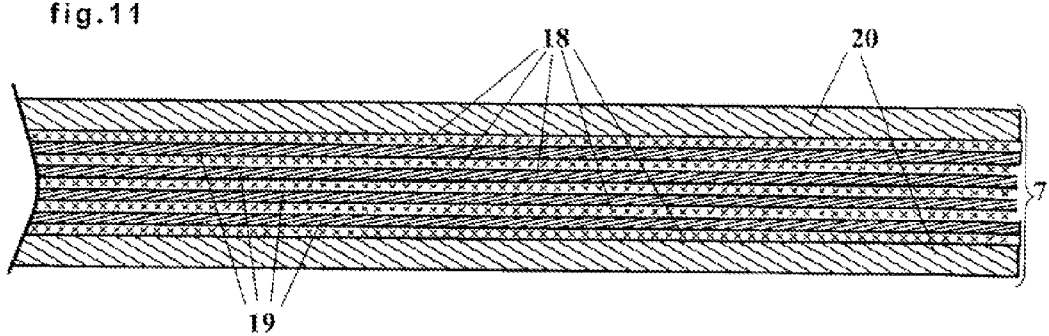

Details of a join made by means of sewing on a multi-ply belt, that is to say one with several layers of carcass:

The piece of so-called multi-ply conveyor belt 17 shown in FIG. 11 comprises the carcass plies 18, the interplies 19 made of a rubber material for example and the covering 20 made of rubber for example.

According to one method of executing the steps in the method according to the invention:

The first step consists of cutting at right angles the two ends to be spliced as shown in FIG. 11. This step can be done using a sharp blade for example or any type of cutting tool, electrical or pneumatic, or by water jet . . . .

Figure 12:
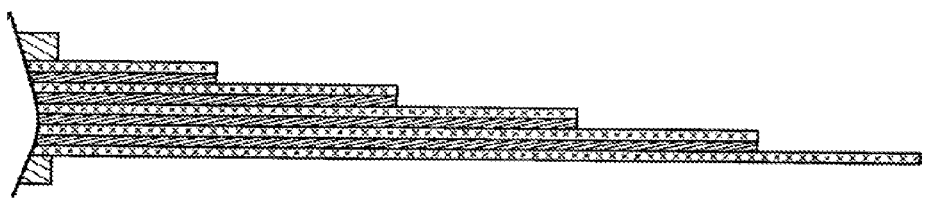

The second step consists of removing the covering as shown in FIG. 12. This step can be done using a Stanley knife to remove strips of covering or by sanding the covering with a disc sander for example. The length of the covering removed must be longer than the length of the staggered steps.

The third step is shown in FIG. 12 and consists of cutting staggered steps into the different plies of the conveyor belt. The length of the plies depends on the belt, but in a common case, a length of 100 mm will be sufficient.

The staggering can be achieved using a mechanical sander for example or by cutting strips from the different plies of the carcass. The staggering of the two ends to be spliced together must match, and so be made on the top and on the underneath respectively on the left and right ends.

Figure 13:
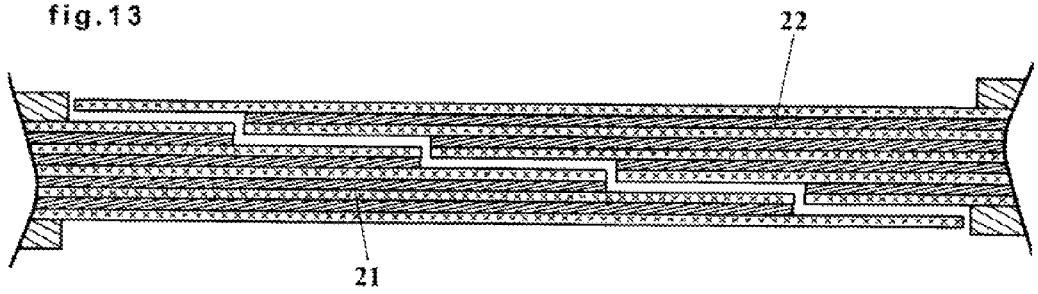
Figure 14:
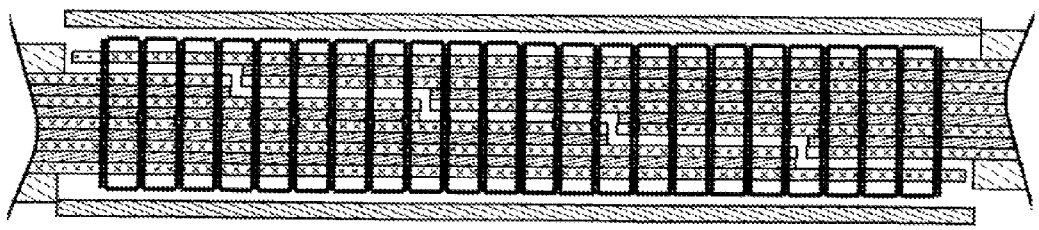

The fourth step shown in FIGS. 13 and 14 consists of assembling the two belt ends 21 and 22 by placing them one over the other before sewing them. The sewing can be done following defined paths as shown in FIG. 2. The aim is to obtain the sewing field filled in a homogeneous way so as to distribute the tensile stresses.

The final step consists of covering the sewn assembly, in order to protect it, with a piece of the covering 15. This step can be achieved by adhesive bonding or vulcanisation for example. This stage is needed to protect the sewing, in particular from the wear caused by the material transported by the conveyor belt.

Figure 15:
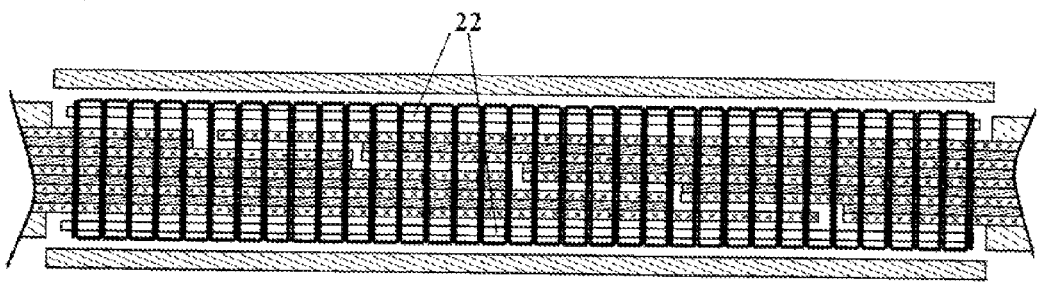
Figure 16:
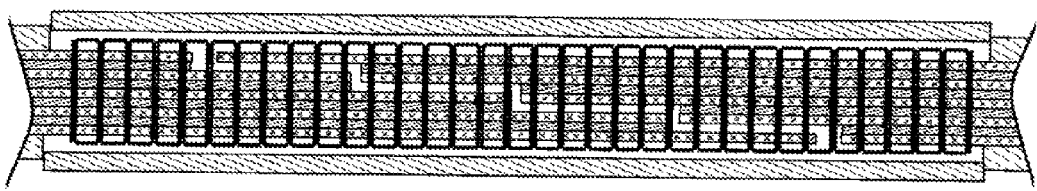
Figure 17:
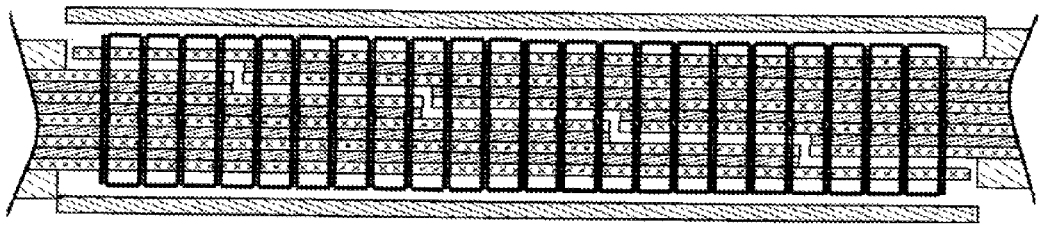

There are several ways of assembling a multi-ply belt by means of sewing according to the invention. FIGS. 15, 16 and 17 show three examples of assembly, respectively:
 a. with a lost ply and the addition of a textile or other reinforcement 22
 b. with a lost ply without the addition of a reinforcement
 c. and without a lost ply and without the addition of a reinforcement.

These different types of assembly will not have the same final thickness and the same effectiveness.

Combinations of the different embodiments shown in the drawings or described above do no fall outside the scope of the invention.

The reference signs inserted after the technical characteristics mentioned in the claims are used solely for the purpose of facilitating the understanding of the latter and in no way limit their scope.

---

Reference signs 1. belt
2. and 3. ends
4. carcass
5. covering
6. covering
7 and 8. ends
9 and 10. ends
11 and 12. ends
13. single-ply carcass
14. rubber covering
15. covering
16. plies,
17. so-called multi-ply conveyor belt
18 carcass plies,
19. interplies,
20. covering
21 and 22. belt ends
a. angle of the teeth in relation to the longitudinal axis of the belt (°)
b. length of the teeth (mm)
c. width of the sample (mm)
d. length of the seam (mm)
d. width of the seam (mm)
f. needle size (hundredths of a mm)
g. stitch length (mm)
h. sewing density (threads/cm)
i. angle of the sewing in relation to perpendicular to the longitudinal axis of the belt (°)

---

The invention claimed is:

1. Method for assembling two ends of a conveyor belt comprising at least one carcass and a covering, by sewing, comprising:
 preparing the ends of the conveyor belt so as to impart a toothed shape defining a plurality of teeth to the join;
 removing the covering over a predetermined length near each of the ends;
 sewing over a predetermined sewing field to assemble the carcasses of the two ends to create a seam;
 positioning a covering so as to cover the seam.

2. Method according to claim 1, wherein the conveyor belt comprises at least the carcass, an interply and the covering.

3. Method according to claim 1, wherein the plurality of teeth of the toothed shape range from 10 mm to 5000 mm in length depending on the thickness and width of the conveyor belt to be spliced.

4. Method according to claim 1, wherein the sewing presents a sewing density of 1 to 100 threads per cm, depending on the thickness, width and type of the conveyor belt to be spliced.

5. Method according to claim 1, wherein sewing uses a polymer thread.

6. Method according to claim 1, wherein sewing uses a liquid crystal polymer thread.

7. Method according to claim 1, wherein sewing is carried out with a complementary angle of an angle of sewing threads in relation to a longitudinal axis of the belt being between 0 and 90° inclusive.

8. Method according to claim 1, wherein two different directions of sewing are applied to the sewing field so as to cross corresponding threads, substantially symmetrically in relation to the longitudinal axis of the belt.

9. Method according to claim 1, wherein a length of the stitch varies from 1 to 200 mm.

10. Method according to claim 1, wherein an angle of the teeth of the toothed shape in relation to a longitudinal axis of the belt is between 0° and 90° inclusive, according to the width and thickness of the conveyor belt to be spliced.

11. Method according to claim 1, wherein a mechanical assembly of the two ends is achieved by the sewing field to avoid a "zigzag" or suture-type seam.

12. Use of a sewing method according to claim 1 to assemble two ends of a conveyor belt comprising one or more carcasses, with or without interplies, and a covering.

13. A conveyor belt comprising sections including at least a carcass and a covering, the sections being assembled by a sewing field with a density of 1 to 50 threads per cm, with a symmetrical or asymmetrical cut to obtain a plurality of offset teeth.

14. A method for assembling a conveyor belt, by sewing, a first end of a first carcass and a second end of a second carcass, each of the first and second carcasses comprising a plurality of plies and a covering, the method comprising:
 removing the covering over a predetermined length near each of the first and second ends;
 cutting staggered steps into each of the plurality of plies over a predetermined length near the first end and cutting corresponding staggered steps into each of the plurality of plies over a predetermined length near the second end;
 placing the staggered steps near the first end over onto the corresponding staggered steps near the second end;
 sewing the staggered steps near the first end to the staggered steps near the second end over a predetermined sewing field to join the first and second carcasses and create a seam; and
 positioning a covering over at least the seam.

15. The method according to claim 14, wherein the predetermined length is defined according to at least one of a number of the plurality of plies, a width of the conveyor belt and a thickness of the conveyor belt.

16. The method according to claim 15, wherein the predetermined length ranges from 1 mm to 5000 mm.

17. Method for assembling two ends of a conveyor belt comprising at least one carcass and a covering, by sewing, comprising:
 preparing the ends of the conveyor belt so as to impart a toothed shape to the join;
 removing the covering over a predetermined length near each of the ends;
 inserting and sewing woven or non-woven reinforcements near each of the ends;
 sewing over a predetermined sewing field to assemble the carcasses of the two ends to create a seam; and
 positioning a covering so as to cover the seam.

* * * * *